March 1, 1927. 1,619,336
V. DREWSEN
PROCESS AND APPARATUS FOR MAKING CONCENTRATED CARBON DIOXIDE
Filed Oct. 12, 1921
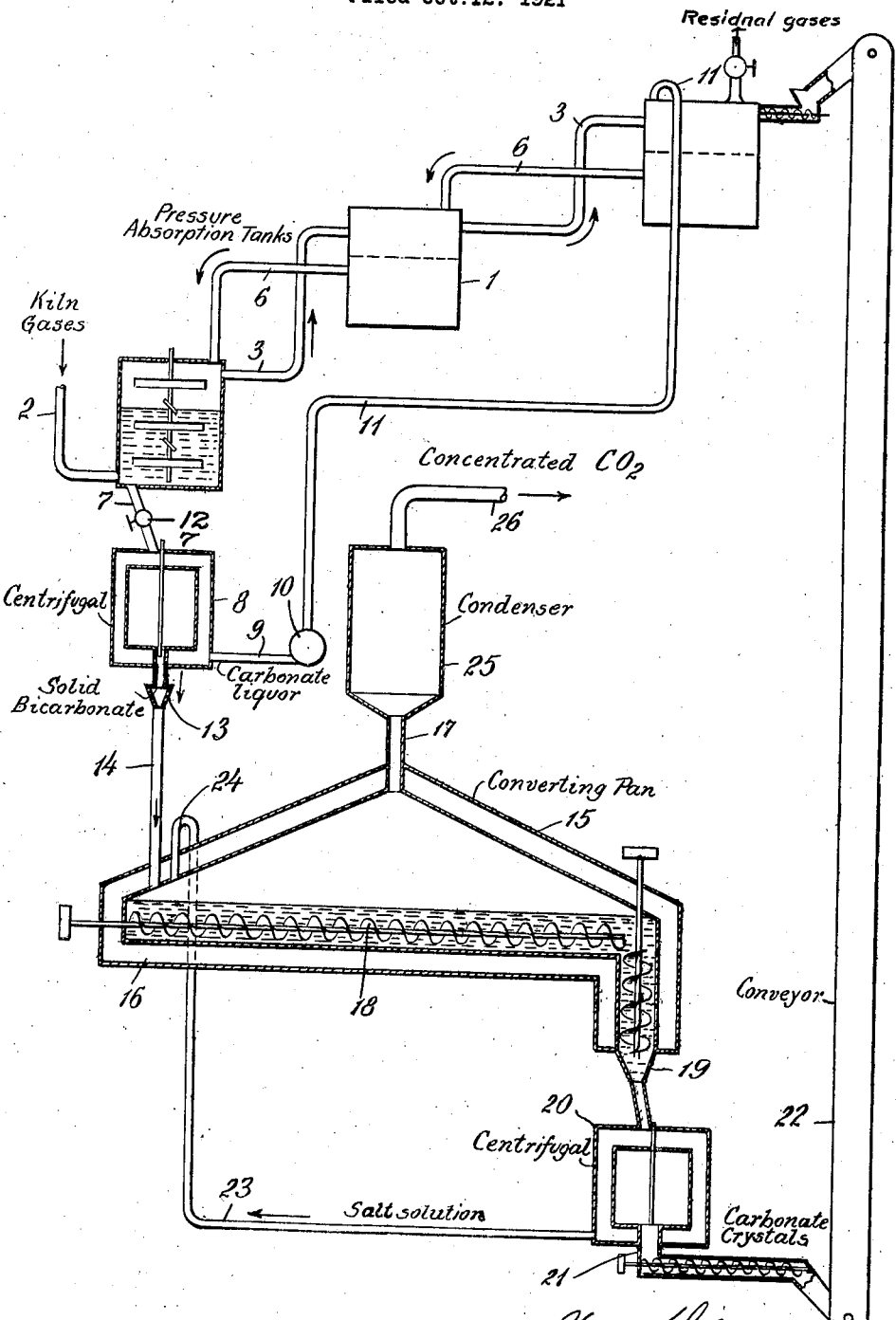
BY Viggo Drewsen
Harry L. Duncan
ATTORNEY.

Patented Mar. 1, 1927.

1,619,336

UNITED STATES PATENT OFFICE.

VIGGO DREWSEN, OF BROOKLYN, NEW YORK, ASSIGNOR TO WEST VIRGINIA PULP AND PAPER COMPANY, OF NEW YORK, N. Y., A CORPORATION OF DELAWARE.

PROCESS AND APPARATUS FOR MAKING CONCENTRATED CARBON DIOXIDE.

Application filed October 12, 1921. Serial No. 507,375.

This invention relates especially to processes and apparatus for chemically concentrating carbon dioxide so that if desired relatively strong or pure carbon dioxide can be made from flue gases or other weak gaseous mixtures. For this purpose the weak gases may be absorbed in suitable carbonate liquor such as a solution of sodium or potassium carbonate which may be effected in one or more pressure absorption tanks. The carbon dioxide absorbed converts a corresponding amount of the sodium carbonate, for instance, into the relatively insoluble bi-carbonate which may be separated in a centrifugal separating device, the remaining carbonate liquor being returned to the absorption tanks. The bi-carbonate may be heated in a steam jacketed or other heating pan to drive off relatively pure carbon dioxide therefrom and this may be effectively done in strong sodium chloride or other suitable salt solution in which preferably the remaining carbonate is relatively insoluble so as to be separated by centrifugal devices and returned to the absorption tanks, while the remaining salt solution may be continuously or otherwise returned to the heating pan or device, an illustrative apparatus for this purpose being shown diagrammatically in the accompanying drawing.

In the accompanying diagram a series of three or more tanks 1 which may have agitating devices of any suitable character, may be connected by the liquor flow pipes 6 so that the carbonate liquor such as sodium carbonate solution or the like gradually passes from one to the other of these tanks through the pipes 6. At the same time, weak carbon dioxide gases such as kiln gases, containing 30 to 35% more or less of carbon dioxide, may be fed through the pipes 2 under suitable pressure so as to be progressively absorbed in the tanks which are preferably operated under pressure, such as 60 to 100 pounds or so per square inch. The carbon dioxide is absorbed in these tanks so as to more or less convert the sodium or other carbonate into the bi-carbonate which is, of course, insoluble, and the bicarbonate and suspending liquor may be taken from the last or lowest tank 1 through the discharge pipe 7 which may have the control valve or device 12 so that regulated amounts are supplied to the centrifugal separator device 8 which is preferably a continuous centrifugal shown diagrammatically. This operates to continuously separate the solid sodium bicarbonate which may be discharged from the centrifugal into the throat or hopper 13 of the conveyor 14 by which it is carried to the converting tank 15 while the carbonate liquor from the centrifugal is delivered through the pipe 9 which may lead to the pump or circulating device 10 forcing the liquor back through the pipe 11 to one of the tanks 1.

In the converting tank or pan 15 the sodium bicarbonate may meet a substantially saturated solution of sodium chloride at a temperature of about 110° C. which is maintained by the steam jacket 16 below. This boiling temperature of the solution drives off concentrated carbon dioxide through the pipe or flue 17 while the material is being agitated and carried forward over or across the converting pan by the screw or other conveyor 18. Finally, the solution drops down through the passage 19 into another continuous centrifugal 20, for instance, which separates therefrom the sodium carbonate which is substantially insoluble in the concentrated sodium chloride solution.

This crystallized sodium carbonate is thus discharged through the throat of passage 21 into the conveyor 22 of any suitable character which conveys it to the pipe or passage 5 communicating with the tanks 1. The centrifugal 20 discharges the sodium chloride solution into pipe 23 from which it is returned through the pipe 24 into the converting pan 15 to again react with further quantities of the sodium bicarbonate delivered to the pan.

If desired, of course, the passage or pipe 17 may communicate with a suitable cooler such as 25, of any suitable character, for cooling or refrigerating the carbon dioxide and condensing and separating the steam therefrom, which flows back through the passage 17 into the converting pan while the carbon dioxide passes off through the pipe or passage 26 for recovery or further liquefaction treatment.

It will be obvious from the foregoing that many changes in details may be made without departing from the spirit and scope of my invention.

What I claim is:

1. The process of making concentrated carbon dioxide from gases containing carbon dioxide, which comprises forcing the said gases through a series of pressure absorption tanks and simultaneously passing sodium carbonate liquor through said tanks in the opposite direction to effect the progressive absorption of carbon dioxide by said liquor and its corresponding conversion into bicarbonate, centrifugally separating said bicarbonate from said liquor and returning the remaining carbonate liquor to said absorption tanks, mixing said bicarbonate with a saturated sodium chloride solution and heating the mixture to drive off substantially concentrated carbon dioxide and simultaneously form relatively insoluble crystallized carbonate therein, centrifugally separating from said solution the crystallized carbonate and returning the same to said absorption tanks, and returning the remaining salt solution for admixture with said bicarbonate.

2. The process of making concentrated carbon dioxide from gases containing carbon dioxide, which comprises forcing the said gases through a series of absorption tanks and simultaneously passing sodium carbonate liquor through said tanks in the opposite direction to effect the progressive absorption of carbon dioxide by said liquor and its corresponding conversion into bicarbonate, centrifugally separating said bicarbonate from said liquor and returning the remaining carbonate liquor to said absorption tanks, mixing said bicarbonate with a saturated sodium chloride solution and heating the mixture to drive off substantially concentrated carbon dioxide and simultaneously form relatively insoluble crystallized carbonate therein and centrifugally separating from said solution the crystallized carbonate and returning the same to said absorption tanks.

3. The process of making concentrated carbon dioxide from gases containing carbon dioxide which comprises forcing the said gases through a series of pressure absorption tanks and simultaneously passing carbonate liquor through said tanks in the opposite direction to effect the progressive absorption of carbon dioxide by said liquor and its corresponding conversion into bicarbonate, centrifugally separating said bicarbonate from said liquor and returning the remaining carbonate liquor to said absorption tanks, mixing said bicarbonate with a strong sodium chloride salt solution and heating the mixture to drive off substantially concentrated carbon dioxide and simultaneously form relatively insoluble crystallized carbonate therein, centrifugally separating from said solution the crystallized carbonate and returning the same to said absorption tanks.

4. The process of making concentrated carbon dioxide from gases containing carbon dioxide which comprises forcing the said gases through a series of pressure absorption tanks and simultaneously passing carbonate liquor through said tanks in the opposite direction to effect the progressive absorption of carbon dioxide by said liquor and its corresponding conversion into bicarbonate, separating said bicarbonate from said liquor and returning the remaining carbonate liquor to said absorption tanks, mixing said bicarbonate with a strong salt solution and heating the mixture to drive off substantially concentrated carbon dioxide.

5. The process of making concentrated carbon dioxide from weak gases containing carbon dioxide which comprises forcing the said gases through absorption tanks and simultaneously passing sodium carbonate liquor into said tank to effect the absorption of carbon dioxide by said liquor and its corresponding conversion into bicarbonate, separating said bicarbonate from said liquor and returning the remaining carbonate liquor to said absorption tank, mixing said bicarbonate with a strong salt solution and heating the mixture to drive off strong carbon dioxide and simultaneously form relatively insoluble crystallized carbonate therein, and separating from said solution the crystallized carbonate and returning the same to said absorption tank.

6. The process of making concentrated carbon dioxide from weak gases containing carbon dioxide which comprises forcing the said gases through an absorption tank and passing sodium carbonate liquor into said tank to effect the absorption of carbon dioxide by said liquor and its corresponding conversion into bicarbonate, separating said bicarbonate from said liquor mixing said bicarbonate with a salt solution and heating the mixture to drive off strong carbon dioxide and simultaneously form relatively insoluble crystallized carbonate therein, and separating from said solution the crystallized carbonate.

7. The process of making concentrated carbon dioxide from weak gases containing carbon dioxide which comprises treating the said gases with sodium carbonate liquor to effect the absorption of carbon dioxide by said liquor and its corresponding conversion into bicarbonate, separating said bicarbonate from said liquor and treating the same to drive off strong carbon dioxide and simultaneously form crystallized carbonate.

8. The process of making concentrated carbon dioxide from gases containing carbon dioxide which comprises forcing the said gases through a series of pressure absorption tanks and simultaneously passing sodium carbonate liquor through said tanks in the opposite direction to effect the progressive absorption of carbon dioxide by said liquor and its corresponding conversion into bicarbonate, separating said sodium bicarbonate from said liquor and returning the remaining carbonate liquor to said absorption tanks and driving off substantially concentrated carbon dioxide from said bicarbonate.

9. The process of making concentrated carbon dioxide from gases containing carbon dioxide which comprises absorbing the said gases in sodium carbonate liquor to effect its corresponding conversion into bicarbonate, centrifugally separating said sodium bicarbonate from said liquor and driving off and recovering substantially concentrated carbon dioxide from said bicarbonate.

10. The apparatus for producing concentrated carbon dioxide from gases containing carbon dioxide which comprises a connected series of pressure absorption tanks having agitating means, a continuous centrifugal separator connected to said absorption tanks and cooperating means to return the remaining liquor to said tanks, a heated evaporating pan provided with a reflux condenser having a gas outlet and with a mechanical discharge conveyor, and a connected continuous centrifugal separator.

11. The apparatus for producing concentrated carbon dioxide from gases containing carbon dioxide which comprises a connected series of pressure absorption tanks, a centrifugal separator connected to said absorption tanks and cooperating means to return the remaining liquor to said tanks, a heated evaporating pan provided with a reflux condenser having a gas outlet and with a mechanical discharge conveyor, and a connected centrifugal separator.

12. The apparatus for producing concentrated carbon dioxide from gases containing carbon dioxide which comprises a connected series of absorption tanks having agitating means, a centrifugal separator connected to said absorption tanks and cooperating means to return the remaining liquor to said tanks, and a heated evaporating pan provided with a reflux condenser having a gas outlet.

VIGGO DREWSEN.